No. 845,891. PATENTED MAR. 5, 1907.
G. S. PRESCOTT.
STABLE IMPLEMENT.
APPLICATION FILED OCT. 15, 1906.
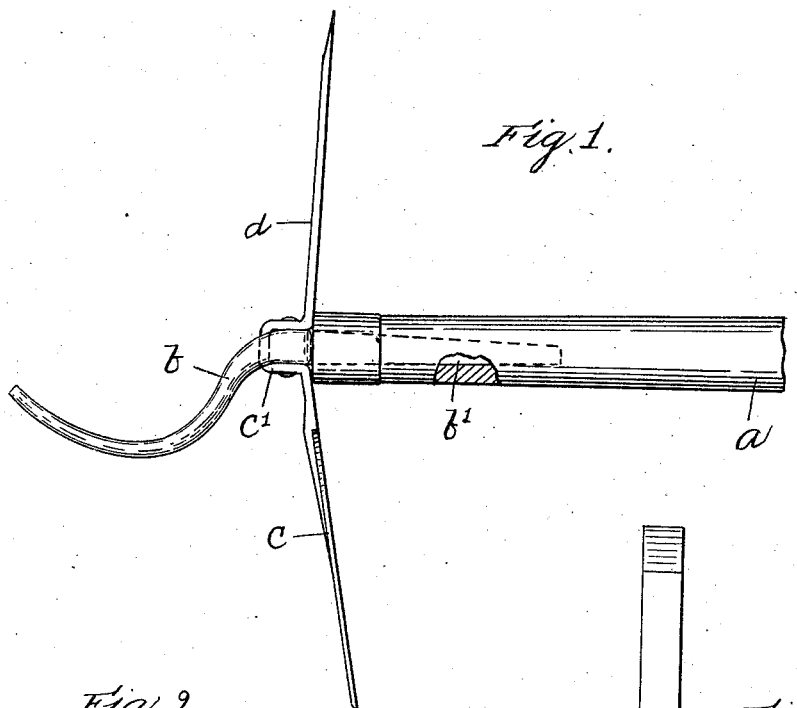
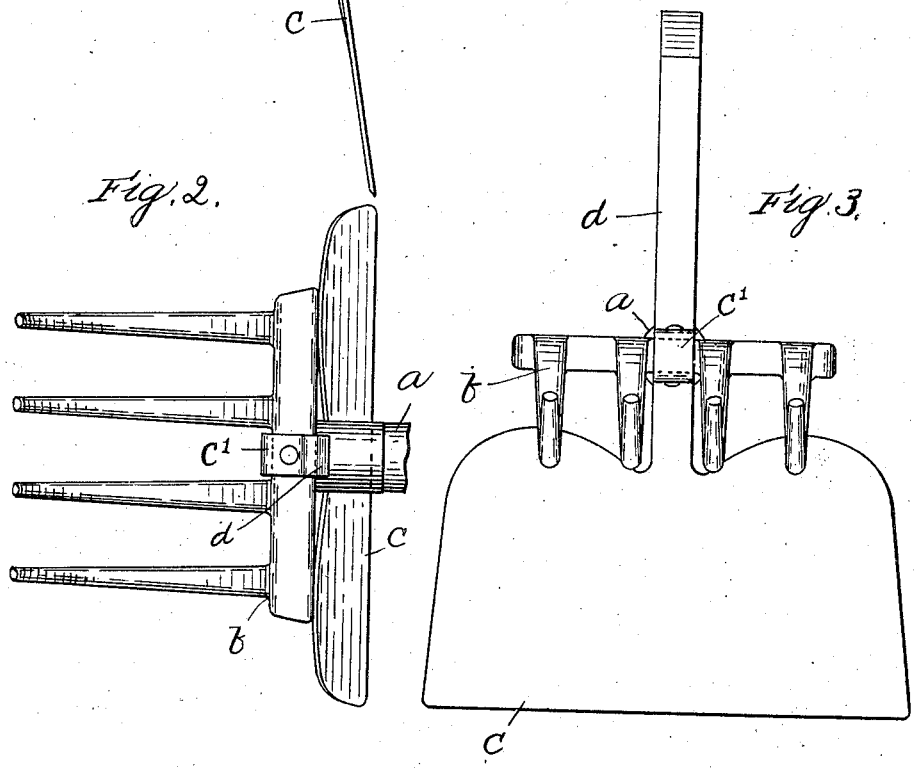
Witnesses:
H. B. Davis.
Cynthia Doyle.
Inventor:
George S. Prescott.
by Hayes & Harriman
Attys.

UNITED STATES PATENT OFFICE.

GEORGE S. PRESCOTT, OF NEW LONDON, NEW HAMPSHIRE.

STABLE IMPLEMENT.

No. 845,891.      Specification of Letters Patent.      Patented March 5, 1907.

Application filed October 15, 1906. Serial No. 338,887.

*To all whom it may concern:*

Be it known that I, GEORGE S. PRESCOTT, of New London, county of Merrimack, State of New Hampshire, have invented an Improvement in Stable Implements, of which the following description, in connection with the accompanying drawings, is a specification, like characters on the drawings representing like parts.

This invention has for its object to construct a stable implement especially adapted for the use of hostlers in caring for the stall-floors of the stable.

The implement comprehends a fork for pitching and turning the bedding and for separating it from the manure, a hoe-blade for cleaning the stall-floor, and a narrow cleaning-point for cleaning out the narrow spaces between the planks composing the stall-floor, and all of these parts are rigidly attached to a handle by which they may be conveniently manipulated as required and the work done with neatness and despatch.

Figure 1 shows in side elevation a stable implement embodying this invention. Fig. 2 is a plan view, and Fig. 3 an end view, of the stable implement shown in Fig. 1.

$a$ represents the handle, which is made of any suitable length; $b$, the fork, which is attached to the extremity of the handle and which extends forward at any desired angle. It may comprise two or more tines, as desired, four being herein shown, and said tines are formed integral with or secured to a head or crown having a tang $b'$, which is adapted to be driven into the handle to thereby rigidly secure the fork thereto.

$c$ represents a wide hoe-blade, and $d$ a narrow cleaning-point, and said blade and point are rigidly secured to the handle $a$.

As herein shown, the blade $c$ and point $d$ are integrally formed and have a bent portion $c'$ between them, which is shaped to embrace the head or crown of the fork and when placed in position thereon, as shown in Fig. 1, is secured thereto by a pin extended through the bent portion and through the head or crown; but the blade and point and fork may be otherwise connected together. The blade and point thus extend in opposite ways, one above and the other below the fork, and are disposed at approximately right angles to the fork and to the handle.

I do not desire to limit my invention to the particular manner herein shown for rigidly securing the several parts to the handle nor to the employment of all of the aforesaid parts.

The forwardly-extended fork $b$ is so disposed on the handle that it may be conveniently used to pitch forward and turn the bedding in the stall and to separate it from the manure, and the hoe-blade $c$ is so disposed that it may be conveniently used to hoe rearward the manure as it is separated from the bedding by the fork, the fork and hoe being used alternately and repeatedly until the work is performed, and the narrow cleaning-point $d$ is so disposed that it may be conveniently used to clean out the narrow spaces between the usual planks composing the stall-floor.

In order that the fork and hoe may be relatively disposed to work in combination to separate the bedding from the manure and to move the bedding forward and the manure rearward, the tines of the fork are arranged to project upward in a direction away from the hoe, so that when the fork is in its proper position for use the hoe will be located below it. By such an arrangement it will not be necessary to reverse the implement, for it will be understood that in performing this work first the fork is moved forward to move forward the bedding, separating it from the manure, then the hoe is moved rearward, moving rearward the manure which has been separated from the bedding, and upon each forward and backward movement of the implement first one and then the other tool will be operated until the bedding has been separated from the manure and has been pitched forward and the manure moved rearward, the entire work being performed with neatness and despatch and with considerable saving in bedding.

In order that the cleaning-point may be easily operated, the ends of the tines of the fork will be held in engagement with the floor to thereby serve as a support by which the depth that the cleaning-point shall enter the spaces between the planks may be regulated, and said tines being extended downwardly in a direction toward the cleaning-point are adapted to operate to move rearwardly the manure which is thrown up by the cleaning-point while said point is operating.

Having thus described my invention, what I claim to be new, and desire to secure by Letters Patent, is—

As a new article of manufacture, the herein-described stable implement consisting of a handle, a forwardly-extended fork having a tang adapted to be driven into the handle, a hoe-blade and a cleaning-point extended in opposite ways having an intermediate bent portion which embraces the head of the fork and is adapted to be secured thereto, the tines of the fork being extended upward in a direction away from the hoe-blade substantially as described.

In testimony whereof I have signed my name to this specification in the presence of two subscribing witnesses.

GEORGE S. PRESCOTT.

Witnesses:
NATHANIEL W. COLBY,
EMMA L. COLBY.